Patented Dec. 18, 1951

2,578,937

UNITED STATES PATENT OFFICE 2,578,937

MIXED BED DEIONIZATION

Robert Kunin, Trenton, and Francis X. McGarvey, Haddon Heights, N. J., assignors to Rohm & Haas Company, Philadelphia, Pa., a corporation of Delaware No Drawing. Application May 22, 1948, Serial No. 28,724

7 Claims. (Cl. 127—46)

This invention relates to the removal of salts and other polar substances from solutions by means of ion-exchange synthetic resins. It is particularly applicable to the removal of salt from aqueous solutions in which it is undesirable to have a substantial change in pH occur.

It is known that salts may be removed from aqueous solutions by passing the solution through a bed of certain cation-exchange materials in their hydrogen form and then through a bed of acid-adsorbing material. It has also recently been found that by using certain anion-exchange materials in which the polar groups are quaternary ammonium groups this order can be reversed. In either order, however, the pH of the solution leaving the first bed is substantially different from that of the original solution and in many instances this is an undesirable condition which limits the applicability of ion-exchange processes of salt removal. It has also been proposed to effect removal of salts from solutions by passing the solution through a mixed bed of cation-exchange material in the hydrogen form and acid-adsorbing resin but such proposals have not heretofore proven practical because on the one hand very large quantities of resin were required to effect salt removal and on the other no practical means was available for the regeneration of the mixed resins.

We have now found, however, that a mixed bed of certain quaternary ammonium type of anion-exchange resins and the known hydrogen-exchange cation-exchange materials not only has a high capacity for removal of salts and other polar materials from solutions but may also be readily separated into its component parts after the bed is exhausted. After separation the individual resins may be regenerated in the usual manner.

The quaternary ammonium type resins we have found to possess these qualities are resins of the type disclosed in the copending applications of Charles McBurney, Serial No. 759,308, filed July 5, 1947, and Serial No. 20,836, filed April 13, 1948. In these resins the polar groups are quaternary ammonium groups which are attached through alkylene groups to aromatic rings of a base resin having a cross-linked or three-dimensional molecular structure. Preferably, the base resin is a styrene polymer that is cross-linked either by being copolymerized with divinyl benzene or by subsequent reaction with a chloromethylating agent, such as the chloromethyl ethers CH₃OCH₂Cl and ClCH₂OCH₂Cl or formaldehyde and hydrogen chloride, in the presence of a Friedel-Crafts condensing agent, such as aluminum chloride. The alkylene groups that join the quaternary ammonium groups to the aromatic rings of the base resin are also introduced by reacting the polymeric material with a chloromethylating agent in the presence of a Friedel-Crafts condensing agent and, when this reaction is used to effect both the cross-linking of the base resin and the introduction of the alkylene bridges, the two effects may be simultaneously accomplished. The quaternary ammonium groups are introduced by reacting the chloromethylated base resin with a tertiary amine such as trimethylamine, triethylamine, tripropylamine, dimethylethylamine, diethyl cyclohexylamine, tricyclohexylamine, triphenylamine, diphenylethylamine, benzyldimethylamine, benzyl phenyl methylamine, and the like.

The following examples illustrate the preparation of these quaternary ammonium type resins.

Example 1

A. Into a one-liter, three-necked, balloon flask equipped with thermometer, mechanical stirrer, and reflux condenser was poured 400 ml. of water and 34 ml. of a 1.5% aqueous solution of magnesium silicate. Agitation was begun and a solution containing 97.5 g. of styrene, 1 g. of divinyl benzene, and 1.5 g. of ethyl styrene, with 1 g. of benzoyl peroxide dissolved therein, was added to the contents of the flask. The stirred mixture was then heated to 90° C. and held there for one and one-half hours, after which the mixture was heated at refluxing temperature for an additional one and one-half hours. The reaction mixture was then cooled to room temperature and the solid spheroids of the copolymer were separated from the liquid by decantation and filtration, air-dried, and finally oven-dried for two hours at 125° C.

In a similar manner copolymers containing up to 10% of divinyl benzene may be prepared.

B. Fifty grams of the beads of copolymer prepared in part A above were placed in a one-liter, three-necked, balloon flask equipped with thermometer, mechanical stirrer, and reflux condenser. This amount corresponds to 0.5 mole of styrene in the form of a cross-linked copolymer. One hundred grams (1.25 moles) of chloromethyl ether, having the formula

was added and the mixture was allowed to stand at room temperature for 15 minutes during which time the beads of copolymer swelled. The mixture was then diluted with 115 ml. of petroleum ether (B. P. 30° C.–60° C.) and agitation was begun. The reaction mixture was cooled to 0° C. by means of an ice-salt bath and at this point 30 grams (0.23 mole) of anhydrous, powdered aluminum chloride was added in small portions over a period of one hour, after which the mixture was stirred at 0° C. for two hours. Then 500 ml. of ice-water was slowly added in order to decompose the excess of aluminum chloride and chloromethyl ether. The resultant mixture was stirred for 30 minutes and was filtered. The beads were first dried in air, then washed several times with water and finally dried in an oven at 125° C. for two hours.

The beads contained 21.97% chlorine by analysis.

C. In a 500 ml., three-necked, balloon flask, equipped with an agitator, reflux condenser, thermometer, and a gas-inlet tube, were placed 115 ml. of benzene and 50 grams of the chloromethylated beads prepared in part B above. Agitation was begun and the mixture was heated to refluxing temperature and held there for 30 minutes, during which time the beads swelled. The mixture was cooled to 20° C. and was saturated with anhydrous trimethylamine gas. The mixture was then heated to 50° C.–55° C. and held there for four hours while a steady stream of trimethylamine was passed therethrough. The mixture was then cooled to room temperature and allowed to stand overnight, after which the beads were filtered off, washed twice with benzene, and air-dried. The dried beads, free of benzene, were then mixed with a 10% aqueous solution of sulfuric acid for two hours, after which they were washed thoroughly with water and were finally converted to the form of the quaternary ammonium hydroxide by being stirred with a 15% aqueous solution of sodium hydroxide. The final product was washed with water until the wash-water no longer gave a pink color with phenolphthalein.

*Example 2*

A. Into a five-liter, three-necked, balloon flask equipped with thermometer, mechanical stirrer, and reflux condenser was poured 1800 ml. of water which contained as dispersing agent 27 g. of a 20% solution of a copolymer of substantially equal parts of styrene and maleic acid dissolved in aqueous ammonia. Agitation was begun and a solution containing 10.8 g. of benzoyl peroxide dissolved in 1080 g. of styrene was added to the contents of the flask. The stirred mixture was then heated to 85° C.–90° C. and held there for four and one-half hours. The reaction mixture was cooled to room temperature by the addition of cold water, and the spheroids of polystyrene were separated from the liquid by decantation and filtration and then allowed to air-dry overnight.

The yield of polystyrene particles was quantitative. At this stage the polystyrene particles were fusible and soluble in all of the polystyrene solvents.

B. Forty-three grams of chloromethyl ether, having the formula $CH_3$—O—$CH_2Cl$, containing 13.12 g. (0.1 mole) of anhydrous, powdered aluminum chloride dissolved therein was poured into a one-liter, three-necked, balloon flask equipped with a thermometer, mechanical stirrer and reflux condenser. The flask and contents were cooled to 0° C. by means of an ice-salt bath and 100 ml. of petroleum ether (B. P. 30° C.–60° C.) was added. Agitation was begun and 25 g. of polystyrene particles prepared in part A above were added in small portions over a period of 30 minutes after which the cooling bath was removed. The reaction mixture was stirred for three hours at room temperature. Then the mixture was again cooled to 0° C. by means of an ice-salt bath and 125 ml. of ice-water was slowly added in order to decompose the excess of aluminum chloride and chloromethyl ether. The resultant mixture was stirred for one hour and was filtered. The beads were washed with water for two hours, filtered, and dried in an oven for two hours at 125° C.

At this stage the beads were infusible and insoluble in all of the common solvents for polystyrene. The beads contained 18.16 per cent chlorine by analysis.

C. In a one-liter, three-necked, balloon flask, equipped with a mechanical stirrer, reflux condenser, thermometer, and a gas-inlet tube, were placed 250 ml. of toluene and 30 grams of the chloromethylated beads prepared in part B above. This mixture was allowed to stand at room temperature for one hour, during which time the beads swelled. Agitation was begun and the mixture was cooled to 20° C. and saturated with anhydrous trimethylamine gas. The mixture was then allowed to come to room temperature and stirred for four hours. After this time agitation was stopped and the beads were removed by filtration. The toluene-wet beads were stirred for one hour in two 200 ml. portions of methanol in order to remove the last traces of toluene. The beads were removed by filtration, washed with water, and stirred with 500 ml. of 10% hydrochloric acid for two hours. (At this stage analysis of the beads showed that they contained 4.27% N and 10.97% Cl.) The acid-leached beads were washed thoroughly with water and were finally converted to the form of the quaternary ammonium hydroxide by being washed in a column with a 5–10% aqueous solution of sodium hydroxide until a positive chloride ion test could no longer be obtained. The final product was washed with water until the wash-water no longer gave a pink color with phenol phthalein.

Resins of this type in the form of their hydrogen chloride salts have an actual density, when wet, of approximately 1.10 grams per ml. whereas the cation-exchange resins presently available in commerce have, when wet and exhausted, actual densities of the order of 1.30–1.38 grams per ml. These substantial differences in densities between the two types of resins permit their ready separation either by means of a liquid having a density intermediate the two so that one resin will float in it and the other will sink or by passing water upwards through a bed of mixed resin at such a rate that the quaternary ammonium type resin is carried out of the column whereas the cation-exchange resin is not. It has furthermore been found that, unlike previously known anion-exchangers, these quaternary ammonium type exchangers have an extremely high capacity for adsorbing anions even when mixed with cation-exchange resins in their hydrogen form. Therefore, it becomes possible to utilize them in a mixed bed operation without requiring extremely high ratios of resin to solution.

The cation-exchange resins that may be used in the mixed bed include the sulfated or sulfonated phenol-formaldehyde resins such as are disclosed in U. S. Patents Nos. 2,191,853, 2,228,159, and 2,228,160; the sulfonated styrene-divinyl benzene resins described in U. S. Patent No. 2,366,007, particularly those containing 10% or more of divinyl benzene in the copolymer; the cross-linked polymers of polymerizable acids described in U. S. Patents Nos. 2,340,110 and 2,340,111; and the dense, sulfonated, carbonaceous materials of the type described in U. S. Patent No. 2,191,060.

The following examples are given to illustrate the efficiency of the quaternary ammonium type resin in removing ions when used in a mixed bed operation.

Example 3

Mixtures of a cation-exchange resin in its hydrogen form made by sulfonating a styrene-divinyl benzene copolymer and a quaternary ammonium type resin in its hydroxyl form made by the procedure of Example 1 were prepared by mixing 8.6 parts by weight of the wet cation-exchanger with 15.7 parts by weight of the wet quaternary ammonium type resin. The screen grading of these resins was 20–50 mesh. The cation-exchange resin in this mixture had a capacity of 17.8 milliequivalents of cation and the quaternary ammonium resin had a capacity of 10.0 milliequivalents of anion. The anion-exchange resin was, therefore, the limiting factor on the capacity of the mixture. Four samples of this mixture were made.

Four samples of salt solutions having the following strengths of sodium chloride were prepared:

| Sample No. | Concentration of NaCl (p. p. m. as $CaCO_3$) | Milliequivalents of NaCl in sample |
|---|---|---|
| 1 | 180 | 1.8 |
| 2 | 450 | 4.5 |
| 3 | 900 | 9.0 |
| 4 | 1,800 | 18.0 |

To each sample of solution a sample of ion-exchange resin mixture was added and the resin and solution allowed to stand for 16 hours. The solutions were then analyzed for conductivity, pH, and chloride ion, and the following results obtained:

| Sample No. | Conductivity, Ohms/Cm. | pH | Chloride Ion, p. p. m. as $CaCO_3$ |
|---|---|---|---|
| 1 | 87,500 | 5.3 | 10 |
| 2 | 36,500 | 5.3 | 20 |
| 3 | 8,000 | 6.1 | 50 |
| 4 | 700 | 2.7 | 430 |

Example 4

This example is given to illustrate the rate of ion adsorption by a mixed bed of quaternary ammonium type resin and sulfate type resin. The quaternary ammonium resin was prepared by the procedure of Example 1 using, however, sufficient divinyl benzene to produce a copolymer containing 6% divinyl benzene. The sulfate type resin was again a sulfonated styrene-divinyl benzene copolymer. The anion-exchange resin had a capacity of 1.13 m. e./g. (wet) and the cation-exchange resin had a capacity of 2.27 m. e./g. (wet). A mixture of 40 grams of the anion-exchanger and 20 grams of the cation-exchanger (equivalent parts of each) was placed in a vessel equipped with stirrer and conductivity cell. One hundred fifty milliliters of deionized water was added. Small portions of a 0.086 N sodium chloride solution were added at intervals and after each addition the time required for the conductivity of the solution in the vessel to drop to 20,000 ohms per cc. was measured. This conductivity was selected as the end-point for measuring substantially complete deionization. In the following table the first column is the ratio of total equivalents of sodium chloride added to the total equivalent capacity of the resin mixture, and the second column is the time required after each portion of salt solution was added for the conductivity to drop to the selected end-point.

| Equivalents NaCl / Equivalents of Resin Mixture | Time |
|---|---|
| .0023 | 4 min. |
| .017 | 5–10 min. |
| .041 | 5–10 min. |
| .23 | 10 min. |
| .63 | 30 min. |
| .99 | 2–3 hrs. |

In commercial operation the mixed resins may be used either in batch or in column operation. In batch operation it is necessary only to add the resin mixture in the desired amount to the solution being treated and allow the resin and solution to remain in contact, preferably while being stirred, for the required length of time. As is shown in Example 4, the time for complete deionization can be substantially lessened by using excess of resin. It may also be lessened by bringing the fresh solution into contact with one batch of partially exhausted resin mixture and then into contact with a fresh bed of resin mixture in which the capacity of the resin is in excess of that required for complete deionization. The unused excess capacity may then be used to partially desalt fresh solution.

In column operation the solution being treated is passed downward through a column of resin as is customary practice in ion-exchange operations and again advantages are derived by utilizing two or more columns of resin. When two columns are used, the first column in the series may be carried substantially beyond the point of salt breakthrough before it is taken off the line for regeneration and, when it is taken off, the fresh solution may be passed to the partially exhausted column and a column of fresh resin added.

Another feature of mixed bed operation is that by having an excess of either resin present in the mixture the pH of the treated solution may be controlled. Excess quaternary ammonium type exchanger will produce an alkaline condition in the treated solution and excess sulfate type resin will produce an acidic condition.

After the resin mixture is exhausted, it may be separated into its component parts by passing a stream of water or other suitable liquid upwards through the mixture at a rate sufficient to carry out the less dense quaternary ammonium resin but not the denser cation-exchange resin. The rate of upward flow of water best suited for the separation will depend upon the particle size of the resins, their relative density, the uniformity in the particle size, the temperature of the water, and other factors.

All upward flow of water through a bed of any resin will cause the bed to expand and the expansion will increase as the upward flow increases until eventually it is completely carried off by the water. The upflow rate that will cause a particular resin to be carried off by water is herein referred to as the rate for "fluidizing" the resin. In separating the mixture of resins herein-described, a column should be used having a volume in excess of the quantity of resin to be treated and preferably from two to four times its volume. The upward flow of water through the column will expand the bed, and by maintaining the bed in its expanded condition the difference in density between the two resins will cause them to stratify with the lighter ones on top and the heavier ones below. In effecting a separation of the mixture of resins herein used, the rate of upward flow of water may be gradually increased until the rate is intermediate the rate for fluidizing the quaternary ammonium type resin and the rate for fluidizing the cation-exchange resin; or it may be first raised to a point that will cause a predetermined expansion of the resin bed as, for example, a 100% expansion and held at that rate to allow a partial or complete stratification of the component resins and then raised to a rate of flow that will fluidize the quaternary ammonium resins.

The exhausted quaternary ammonium resins of the preceding examples when alone in a column will expand to twice their original volume (100% expansion) when backwashed with 50° F. water at an upflow rate of about 1.5 gal. per sq. ft. of column cross-section per minute. The exhausted sulfated styrene polymers used in Examples 3 and 4 require an upflow rate of about 16 gal./sq. ft./minute for 100% expansion when alone in the column. A mixture of equivalent amounts of each, as was used in Example 4, will expand to 100% of its original volume at an upflow rate of 4–5 gals./sq. ft./min. At an upflow rate of 10 gals./sq. ft./min. the bed will expand to about 300% and at 12½ gals./sq. ft./min. the bed will expand to about 400%. When the upflow rate reaches about 17½ gals./sq. ft./min., the quaternary ammonium resin will be fluidized. The sulfonated polystyrene resin is fluidized at an upflow rate of 40 to 50 gals./sq. ft./min. In practice we prefer to raise the upflow rate to cause a 100%–300% expansion of the mixed bed and then, after stratification occurs, increase the rate of flow to from 20 to 30 gals./sq. ft./min. or until the cation-exchange stratum expands to from 150 to 300%. Substantially complete separation of the resin mixture used in Example 4 can be accomplished at an upflow rate of 23 gals./sq. ft./min. of water at 50° F.

The sulfonated phenolic resins and the acrylic acid- or methacrylic acid-divinyl benzene copolymers are somewhat less dense than the sulfonated polystyrene resins. Accordingly, somewhat more time will be required for them to stratify at any fixed degree of bed expansion. Similarly, lack of uniformity in particle size will affect the rate of settling and the flow rates and times required for satisfactory separation. Different ions adsorbed will likewise make some difference in density of the resins but not a sufficient difference to interfere with their separation. These factors are all compensated for, however, by adjusting the upflow rate to cause a 100% to 400% expansion of the bed, holding it there until stratification of the two resins occurs, and then increasing the rate to carry the upper stratum out of the vessel. If desired, an additional water inlet may be provided at an intermediate point in the height of the column used for separation in order to provide a more rapid flow in the upper portion of the column for carrying off the upper stratum after stratification has occurred.

While the foregoing examples illustrate the invention as applied to a simple aqueous solution of common salt, it is equally applicable to ionizable materials such as the salts of the alkali, alkaline earth, and heavy metals with the mineral acids such as the halogen acids, sulfuric, phosphoric, and organic acids such as formic, acetic, oxalic, succinic, malic, and citric. It is also applicable to the separation of salts of organic cations such as amine and quaternary ammonium ions such as the methylamines and betaines.

Similarly, the invention is not limited to deionization of water alone but may be applied to the purification of solutions of organic materials containing polar impurities. The following example is given to illustrate its application to the removal of salts from sugar solutions in which it is particularly applicable because of the objection to acidic conditions during sugar-refining.

*Example 5*

A mixture of equivalent parts of the two resins used in Example 4 was added to a dark brown beet molasses of 31 Brix in such proportion that the salt content of the molasses was equivalent to 88% of the capacity of the resin mixture. The mixture was stirred for two hours and then allowed to remain still. The specific gravity of the molasses was approximately 1.140 which is intermediate the specific gravities of the two resins and, therefore, the quaternary ammonium resin came to the surface and the sulfonated polystyrene resin sank. The quaternary ammonium resin was decanted and each resin filtered from the molasses, washed and regenerated. The original dark brown molasses had a conductivity of 27 ohms/cm. whereas after the treatment it was water-white and had a conductivity of 3,600 ohms/cm. By repeating the treatment using the same proportion of resin the conductivity of the molasses may be reduced to above 28,000 ohms/cm. The resin separated from the molasses after the second treatment is only slightly exhausted and may be used without regeneration in treating a fresh batch of molasses.

From this example it is to be noted that the mixed bed treatment of the beet molasses not only removed the inorganic salts but at the same time completely removed the complex organic coloring matter from the molasses. This example also illustrates the use of a liquid of specific gravity intermediate the specific gravities of the two resins to effect a separation of the two. This method may be used with sugar solutions of from 30 Brix to 70 Brix all of which will float the quaternary ammonium resins but not the cation-exchange resins. Alternatively, the resins may be separated as previously described by draining the sugar solution, washing off adhering solution, and backwashing to stratify and fluidize the quaternary ammonium resin. In either case the separation may be accomplished in the same vessel used for the sugar treatment or the entire contents of the reaction vessel may be transferred to special separating equipment such as a centrifuge.

After regeneration of the separated resins by procedures well known in the art, for example, by passing a solution of NaOH through a bed of the quaternary ammonium resin and a solution of HCl or $H_2SO_4$ through a bed of the cation-exchanger, the resins are washed free of excess regenerant and may then be reused.

This method is applicable to all the sugar solutions handled at the various stages of beet and cane sugar processing, particularly to defecated raw sugar juices that have been clarified as, for instance, by treatment with lime with or without carbonation, sulfitation or treatment with phosphoric acid, and to affination syrups and the sweet waters obtained during refining. It may also be applied to the mother liquor obtained from massecuites after separation of crystals and even to the final molasses but preferably it should be utilized prior to the solution entering the first evaporator as the removal of salts from the solution avoids scaling of the evaporator. It may also be combined with other deionization processes and particularly the process of removing ash described in copending application of James C. Winters and Robert Kunin, Serial No. 20,847, filed April 13, 1948, now Patent No. 2,551,519. When so combined the sugar solution is given a first treatment with a carboxylic acid ion-exchange resin of the type described in U. S. Patents Nos. 2,340,110 and 2,340,111, whereby up to one-half the ash is removed and then a mixed bed treatment as herein-described. When the mixture of resins is used to remove polar substances from sugar solutions of specific gravity that will not cause flotation of one of the resins and sinking of the other, separation of the resins may be accomplished by removing them from the solution being treated and adding to them a sugar solution or other salt-free liquid of specific gravity intermediate the specific gravities in water of the two resins whereby the quaternary ammonium resin will be caused to come to the surface and the cation-exchange resin to sink.

In general, the process is applicable with anion-exchange resins of the quaternary ammonium type having a specific gravity in water below 1.15 and with cation-exchange resins having a specific gravity in water above 1.25.

We claim:

1. The cyclic process of deionizing a liquid which comprises bringing the liquid into contact with a mixture of an anion-exchange resin having a specific gravity in water below 1.15 and containing quaternary ammonium hydroxide groups attached through methylene groups to aromatic rings of a cross-linked styrene polymer and a cation-exchange resin containing sulfonic acid groups and having a specific gravity in water above 1.25, separating the liquid from the resin, passing water upwards through a column of the mixed resin at a rate sufficient to cause a 100% to 300% expansion of the resin bed and stratification of the two resins, increasing the rate of upward flow to fluidize the anion-exchanger and thereby separate it from the cation-exchanger, regenerating the separated exchangers and remixing the regenerated resins.

2. The cyclic process of deionizing a liquid which comprises bringing the liquid into contact with a mixture of an anion-exchange resin having a specific gravity in water below 1.15 and containing quaternary ammonium hydroxide groups attached through methylene groups to aromatic rings of a cross-linked styrene polymer and a cation-exchange resin containing sulfonic acid groups and having a specific gravity in water above 1.25, separating the liquid from the resin, passing water upwards through a column of the mixed resin at a rate of from 4 to 12½ gallons per square foot of column cross-section per minute to cause expansion of the resin bed and stratification of the two resins, increasing the upward flow to from 20 to 30 gals./sq. ft./min. to fluidize the anion-exchange resin and separate it from the cation-exchange resin, regenerating the separated resins and remixing the regenerated resins.

3. The cyclic process of deionizing a liquid which comprises bringing the liquid into contact with a mixture of an anion-exchange resin having a specific gravity in water below 1.15 and containing quaternary ammonium hydroxide groups attached through methylene groups to aromatic rings of a cross-linked styrene polymer and a cation-exchange resin containing sulfonic acid groups and having a specific gravity in water above 1.25, separating the liquid from the resin, passing water upwards through a column of the mixed resins at an increasing rate of flow up to 20 to 30 gallons per square foot of column cross-sections per minute to cause expansion of the resin bed, stratification of the two resins and finally fluidization of the anion-exchanger whereby it is separated from the cation-exchanger, regenerating the separated resins and remixing the regenerated resins.

4. The cyclic process of deionizing a liquid which comprises bringing the liquid into contact with a mixture of an anion-exchange resin having a specific gravity in water below 1.15 and containing quaternary ammonium hydroxide groups attached through methylene groups to aromatic rings of a cross-linked polymer of a monovinyl aromatic hydrocarbon and a cation-exchange resin containing sulfonic acid groups and having a specific gravity in water above 1.25, separating the liquid from the resin, passing water upwards through a column of the mixed resin at a rate of from 4 to 12½ gallons per square foot of column cross-section per minute to cause expansion of the resin bed and stratification of the two resins, increasing the upward flow to from 20 to 30 gals./sq. ft./min. to fluidize the anion-exchange resin and separate it from the cation-exchange resin, regenerating the separated resins and remixing the regenerated resins.

5. The process of removing salts from aqueous solutions which comprises passing the solution through a bed containing a mixture of anion-exchange resin and cation-exchange resin wherein the anion-exchange resin is a cross-linked polymer of a monovinyl aromatic hydrocarbon containing quaternary ammonium hydroxide groups attached to the aromatic nuclei through methylene bridges and the cation-exchange resin contains sulfonic acid groups as its polar groups.

6. The process of removing salts from aqueous solutions which comprises passing the solution through a bed containing a mixture of anion-exchange resin and cation-exchange resin wherein the anion-exchange resin is a copolymer of styrene and divinyl benzene containing quaternary ammonium hydroxide groups attached to the aromatic nuclei through methylene bridges and the cation-exchange resin contains sulfonic acid groups as its polar groups.

7. The process of removing ionizable materials from sugar solutions which comprises passing the sugar solution through a bed containing a mixture of anion-exchange resin and cation-exchange resin wherein the anion-exchange resin is a copolymer of styrene and divinyl benzene containing quaternary ammonium hydroxide groups attached to the aromatic nuclei through methylene bridges and the cation-exchange resin contains sulfonic acid groups as its polar groups.

ROBERT KUNIN.
FRANCIS X. McGARVEY.

REFERENCES CITED

The following references are of record in the file of this patent:

UNITED STATES PATENTS

| Number | Name | Date |
|---|---|---|
| 2,461,505 | Daniel | Feb. 15, 1949 |
| 2,461,506 | Daniel | Feb. 15, 1949 |

OTHER REFERENCES

Ser. No. 359,575, Smit (A. P. C.), published May 11, 1943.